United States Patent [19]
Gibson

[11] Patent Number: 4,873,529
[45] Date of Patent: Oct. 10, 1989

[54] COPLANAR PATCH ANTENNA

[75] Inventor: Peter J. Gibson, Crawley, England

[73] Assignee: U.S. Philips Corp., New York, N.Y.

[21] Appl. No.: 286,572

[22] Filed: Dec. 16, 1988

[30] Foreign Application Priority Data

Dec. 22, 1987 [GB] United Kingdom ............... 8729876

[51] Int. Cl.[4] .............................................. H01Q 1/38
[52] U.S. Cl. ............................. 343/700 MS; 343/769
[58] Field of Search ............... 343/700 MS, 767–771, 343/846, 829

[56] References Cited

U.S. PATENT DOCUMENTS 4,063,246 12/1977 Greiser ........................ 343/700 MS

OTHER PUBLICATIONS

"Coplanar Stripline Antenna," Microwave Journal, vol. 19, No. 10, Oct. 1976.

Primary Examiner—J. Carroll
Assistant Examiner—Michael C. Wimer
Attorney, Agent, or Firm—Emanuel J. Lobato

[57] ABSTRACT

A coplanar patch antenna is formed, e.g as a printed circuit, on a dielectric support (1) by a metal patch (2) spaced from a coplanar ground plane (3) by a peripheral slot (4), and in the improvement is series fed by means of a slot line (5). The slot (4) can be made resonant by having a periphery of one wavelength or an odd multiple thereof, and a second slot line (7) can be fed into the slot (4) at a distance of one or an odd multiple of a quarter wavelength from the slot line (5) to provide an independent feed. The arrangement presents a feedpoint impedance of about 50 ohms at the ports (6,8) instead of about 400 ohms in prior arrangements.

Balancing loads or 180 degree hybrid feeds to other quadrature ports (11,12) can be used to correct beam asymmetry due to the slot line feeders (5 and 7).

8 Claims, 1 Drawing Sheet

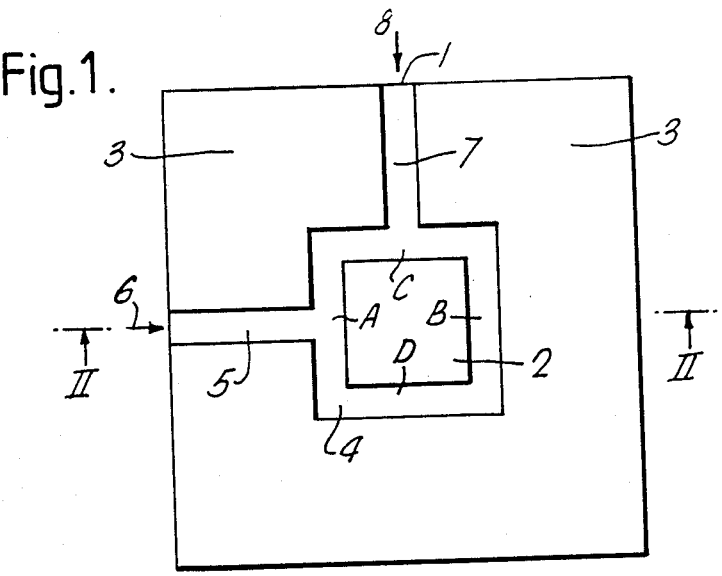
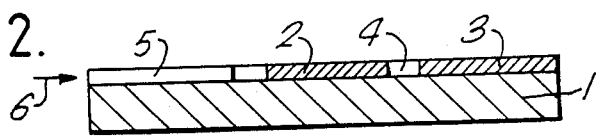
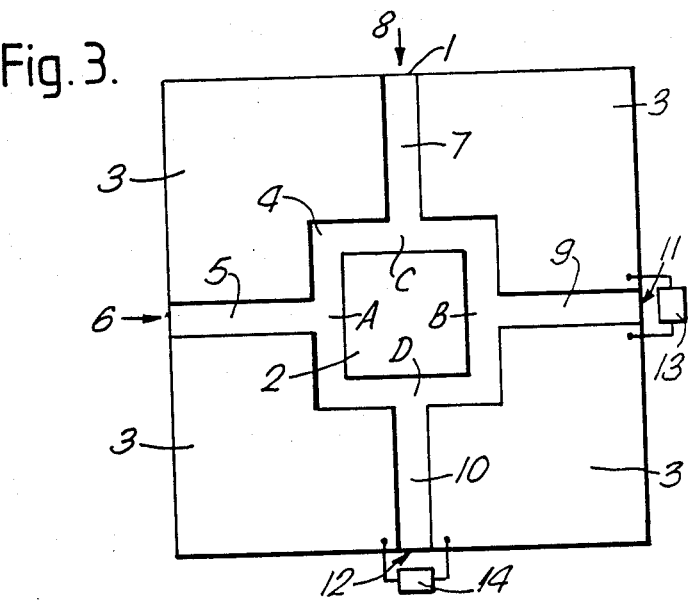

COPLANAR PATCH ANTENNA

BACKGROUND OF THE INVENTION

The invention relates to a coplanar patch antenna including a continuous layer of dielectric material, a patch of conductive material supported on a major surface of the layer of dielectric material, a ground plane of conductive material supported on said major surface of the layer of dielectric material and substantially surrounding and spaced from the patch of conductive material, and means for feeding electrical signals to the antenna. A form of coplanar patch antenna of the kind specified is disclosed in an article "Coplanar Stripline Antenna" by John W. Greiser in Microwave Journal, October, 1976, pages 47 to 49, and in U.S. Pat. No. 4,063,246. In the disclosure, the conducting patch is connected directly to the strip conductor of a coplanar stripline formed in the ground plane supported on the first mentioned major surface of the dielectric layer, and a further ground plane is supported on the other major surface, the dielectric layer being relatively thin so that the further ground plane is in the fringing field between the strip conductor and the first-mentioned ground plane.

This arrangement has an inconveniently high feedpoint resistance of about 400 ohms.

SUMMARY OF THE INVENTION

It is an object of the invention to provide an improved coplanar patch antenna having a feedpoint resistance which is much closer to the typical system impedance of 50 ohms.

According to the invention there is provided a copolanar patch antenna of the kind specified characterised in that the means for feeding electrical signals to the antenna comprises a slot line formed in said ground plane of conductive material and opening into the space between the ground plane and the patch of conductive material.

The perimeter formed by the space between the ground plane and the patch of conductive material can be made substantially an odd number of wavelengths long at the operating frequency so as to form a resonant arrangement. The patch of conductive material can be round, or rectangular or square, and a further slot line can be formed in the ground plane so as to open into the space between the ground plane and the patch of conductive material at a location spaced around the periphery of the patch from the opening for the first-mentioned slot line, for example by one or by an odd multiple of a quarter of a wavelength at the operating frequency.

An arrangement in which two feeds which are effectively isolated from one another by being applied with a quarter wavelength path difference around a resonant loop, can be employed in any of the following ways, inter alia, as for separating a transmit and a receive function, for example in radar, for polarisation diversity because the feeds can provide transmission or reception with polarizations at right angles to one another, or for generating circular polarisation using a suitable phase delay in one feed. Generally a square patch antenna would be employed, however, a circular path may be found to have advantages, e.g. for circular polarisation.

A coplanar patch antenna in accordance with the invention has the advantage that the feedpoint impedance of the series slot line feed is relatively close to the typical system impedance of 50 ohms.

BRIEF DESCRIPTION OF THE DRAWINGS

Embodiments of the invention will now be described, by way of example, with reference to the accompanying drawings of which:

FIG. 1 is a diagram illustrating a coplanar patch antenna in accordance with the invention, FIG. 2 illustrates a transverse section of part of the antenna of FIG. 1, and FIG. 3 illustrates a modification of the antenna shown in FIG. 1.

DETAILED DESCRIPTION

FIG. 1 illustrates diagrammatically a coplanar patch antenna in accordance with the invention and FIG. 2 is a transverse section of a part of FIG. 1. The antenna is formed on a continuous layer 1 of a suitable dielectric material with a relatively high dielectric constant, such as DUROID 6010 which can comprise a printed circuit substrate, and comprises a patch 2 of electrically conductive material and a ground plane 3 also of conductive material, which substantially surrounds and is spaced from the patch 2 by a peripheral gap 4. The patch 2 and the ground plane 3 are supported by the dielectric layer 1 and the assembly can be formed by conventional printed circuit techniques from a printed circuit board. Alternatively, the dielectric supporting layer can be alumina on which a metal layer is applied by vapour deposition.

So far the coplanar patch antenna resembles the antenna disclosed in U.S. Pat. No. 4,063,246, however the patch antenna disclosed therein in fed via a coplanar strip line with a closely spaced backing ground plane located within the fringing field of the strip line, and that arrangement has a high feedpoint resistance of about 500 ohms which is inconvenient to match to typical system components which have an impedance of the order of 50 ohms.

This difficulty is reduced in a coplanar patch antenna in accordance with the invention, by feeding electrical signals to the antenna by means of a slot line 5 formed as a gap in the ground plane 3, which opens at the point A into the peripheral space 4 between the ground plane 3 and the patch 2.

In the present example, the perimeter of the patch 2 formed by the space 4 between the ground plane 3 and the patch 2, is substantially one wavelength long at the operating frequency of the antenna so as to form the peripheral portion of slot line formed by the gap 4 into a resonant ring.

The patch 2 and therefore the corresponding peripheral slot line formed by the space 4, can be circular or rectangular. In the present example the patch 2 is square.

Radio-frequency signals at the operational frequency applied to the end of the slot line 5 at the port 6, suitably via a microstrip to slot line coupling, will divide at the junction A with the peripheral space 4, into two equal but antiphase components travelling clockwise and anticlockwise, respectively around the resonant slotline ring. At the diametrically opposite point B on the slot line ring, these antiphase component signals meet, and by interference generate a virtual short circuit across the resonant slot line section at the point B. This process of reflection sets up a standing wave around the periphery of the patch 2 such that the electric field from the different regions of the ring, generate radiation fields which add constructively into the plane normal to the plane of the antenna and which bisects the slot line 5. In the case of the square patch illustrated by FIG. 1 the fields from the horizontal upper and lower limbs of the slot line ring, i.e. through points C and D, add constructively along the normal to the centre of the patch while the field from the two vertical limbs through points A and B cancel one another. The electromagnetic field which is radiated by feeding the port 6 will have the electric vector vertical, as shown in FIG. 1. The feedpoint resistance of a coplanar patch antenna in accordance with the invention and as illustrated in FIG. 1 is approximately 50 ohms.

The antenna of FIG. 1 is additionally provided with a further slot line 7 also formed as a gap in the ground plane 3, and which opens at the point C into the peripheral space 4 between the ground plane 3 and the patch 2. The point C is located one quarter of the periphery along the slot time ring from the point A at the opening connection of the first slot line 5. Thus the two slot line feeds 5 and 7 are orthogonal and have a high degree of isolation from one another resulting from the symmetrical disposition of the electric field and of the local current zero of the standing wave pattern produced by one feeder, across the feedpoint of the other feeder.

As indicated above, excitation applied at the port 6 to the slot line 5 causes a vertically polarised electromagnetic wave to be radiated, and by the principle of reciprocity, a vertically polarised electromagnetic wave received by the antenna will provide a signal at the port 6. When, however excitation is applied or a signal sensed via a second port 8 to the slot line 7, a horizontally polarised electromagnetic wave will be emitted or received.

The high degree of isolation that can be established between the two feeds via ports 6 and 8 can be of use for separating the transmit and receive functions for example for radar, or can be employed for polarisation diversity communication. The antenna can also be arranged to transmit or receive circular polarisation by introducing a 90 degree phase shift into the feed to one of the ports 6 and 8. In the latter case a circular form for the patch 2 may be advantageous.

It should be noted that a resonant ring configuration can also be provided when the perimeter formed by the space 4 is an odd multiple of one wavelength at the operating frequency, and feeder isolation can be maintained in the arrangement employing two feedpoints 6 and 8 if the locations at which the corresponding slot line feeders 5 and 7 open into the peripheral space 4, are spaced by an odd number of quarter wavelengths.

The antenna shown in FIG. 1 has a slight asymmetry due to the presence of the slot line feeds 5 and 7. Optimum coupling may, therefore, require the dimensions of the antenna to be reduced slightly so that the periphery is less than one wavelength. This will cause the mechanical and the electrical lines of symmetry to by displaced from one another and can be inconvenient.

This difficulty can be overcome by the arrangement illustrated diagrammatically in FIG. 3, in which two further slot line feeders 9 and 10 are formed as further gaps in the ground plane 3 so that they open at corresponding further points B and D, into the peripheral space 4 between the ground plane 3 and the patch 2. The point B is located one quarter of the periphery along the slot line ring from the point C, and the point D is the same distance from both the point B and the point A. The outer ends of the feeders 9 and 10, form further respective ports 11 and 12. In order to restore the electrical symmetry either of two methods can be employed. In FIG. 3 each of the further ports 11 and 12 are terminated by load resistors 13 and 14 which match the impedance of the slot lines 9 and 10.

An alternative method is to feed pairs of opposite ports namely 6 and 11, or 8 and 12, each via a 180 degree hybrid.

I claim:

1. A coplanar patch antenna including a continuous layer of a dielectric material, a patch of conductive material supported on a major surface of the layer of dielectric material, a ground plane of conductive material supported on said major surface of the layer of dielectric material and substantially surrounding and spaced from the patch of conductive material, and means for feeding electrical signals to the antenna, characterised in that the means for feeding electrical signals to the antenna comprises a slot line formed in said ground plane of conductive material and opening into the space between the ground plane and the patch of conductive material.

2. A coplanar patch antenna as claimed in claim 1, characterised in that the perimeter formed by the space between the ground plane and the patch of conductive material, is substantially one wavelength long at the operating frequency so as to form a resonant arrangement.

3. A coplanar patch antenna as claimed in claim 1, characterised in that the perimeter formed by the space between the ground plane and the patch of conductive material, is substantially an odd multiple of one wavelength long at the operating frequency so as to form a resonant arrangement.

4. A coplanar patch antenna as claimed in claim 1, 2 or 3, characterised in that the patch of conductive material is rectangular.

5. A coplanar patch antenna as claimed in claim 4, characterised in that the patch of conductive material is square.

6. A coplanar patch antenna as claimed in any one of claims 1, 2, or 3 characterised in that a further slot line is formed in said ground plane of conductive material so as to open into the space between the ground plane and the patch of conductive material at a location an odd number of quarter wavelengths around the periphery of the patch of conductive material from the opening for the first-mentioned slot line.

7. A coplanar patch antenna as claimed in claim 4, characterized in that a further slot line is formed in said ground plane of conductive material so as to open into the space between the ground plane and the patch of conductive material at a location an odd number of quarter wavelengths around the periphery of the patch of conductive material from the opening for the first-mentioned slot line.

8. A coplanar patch antenna as claimed in claim 5, characterized in that a further slot line is formed in said ground plane of conductive material so as to open into the space between the ground plane and the patch of conductive material at a location an odd number of quarter wavelengths around the periphery of the patch of conductive material from the opening for the first-mentioned slot line.

* * * * *